(12) United States Patent
Sukup et al.

(10) Patent No.: US 8,950,231 B2
(45) Date of Patent: Feb. 10, 2015

(54) SUPPORT FOR A GRAIN BIN FLOOR AND METHOD OF MAKING THE SAME

(71) Applicants: Steven E. Sukup, Clear Lake, IA (US); Tun Ge, Sheffield, IA (US); William C. Shepherd, Hampton, IA (US); Charles E. Sukup, Dougherty, IA (US)

(72) Inventors: Steven E. Sukup, Clear Lake, IA (US); Tun Ge, Sheffield, IA (US); William C. Shepherd, Hampton, IA (US); Charles E. Sukup, Dougherty, IA (US)

(73) Assignee: Sukup Manfucaturing Co., Sheffield, IA (US)

( * ) Notice: Subject to any disclaimer, the term of this patent is extended or adjusted under 35 U.S.C. 154(b) by 215 days.

(21) Appl. No.: 13/656,935

(22) Filed: Oct. 22, 2012

(65) Prior Publication Data

US 2013/0276504 A1    Oct. 24, 2013

Related U.S. Application Data

(63) Continuation-in-part of application No. 13/050,627, filed on Mar. 17, 2011, now Pat. No. 8,297,016.

(60) Provisional application No. 61/314,908, filed on Mar. 17, 2010.

(51) Int. Cl.
| | | |
|---|---|---|
| B21D 47/00 | (2006.01) | |
| B23P 17/00 | (2006.01) | |
| B21D 13/06 | (2006.01) | |
| E04H 7/30 | (2006.01) | |
| F26B 25/10 | (2006.01) | |
| E04H 7/22 | (2006.01) | |
| F26B 9/06 | (2006.01) | |

(52) U.S. Cl.
CPC ........ *B21D 13/06* (2013.01); *E04H 7/30* (2013.01); *F26B 25/10* (2013.01); *E04H 7/22* (2013.01); *F26B 9/063* (2013.01); *F26B 2200/06* (2013.01)
USPC ............... 72/385; 72/324; 72/325; 72/414; 29/897.32; 52/192

(58) Field of Classification Search
USPC ............... 72/177, 318, 324, 325, 385, 414; 52/192, 270, 284, 302.2; 29/897.32, 29/897.3, 897.31, 897.312
See application file for complete search history.

(56) References Cited

U.S. PATENT DOCUMENTS

| | | |
|---|---|---|
| 4,073,110 A | 2/1978 | Kennedy |
| RE31,368 E | 9/1983 | Trumper |
| 4,557,086 A | 12/1985 | Liefer et al. |
| 4,619,085 A | 10/1986 | Carroll et al. |
| 4,841,701 A | 6/1989 | Sukup |
| RE33,358 E | 10/1990 | Sukup |
| 5,170,644 A | 12/1992 | Calabro |
| 6,401,417 B1 | 6/2002 | Leblang |
| 7,845,129 B2 | 12/2010 | Holschlag |
| 2004/0237451 A1 | 12/2004 | Elderson |

*Primary Examiner* — David B Jones
(74) *Attorney, Agent, or Firm* — Zarley Law Firm, P.L.C.

(57) ABSTRACT

A floor support for a grain bin floor made from a sheet of galvanized steel having a top surface, a bottom surface and flat ends. The floor support has a plurality of flanges and notches disposed within the top surface and a plurality of openings disposed through the sheet of galvanized steel. Positioned between each opening is a first bend. Positioned on either side of selected first bends is a second bend thereby forming a z-shaped floor support.

6 Claims, 4 Drawing Sheets

SUPPORT FOR A GRAIN BIN FLOOR AND METHOD OF MAKING THE SAME

CROSS REFERENCE TO RELATED APPLICATION

This application is a Continuation-In-Part of U.S. Ser. No. 13/050,627 filed Mar. 17, 2011 which claims the benefit of U.S. Provisional Application No. 61/314,908 filed Mar. 17, 2010.

BACKGROUND OF THE INVENTION

This invention is directed toward a support for a grain bin floor and more particularly to a support that is easier to manufacture.

Floors which are used in grain storage bins are often-times elevated and supported above a base of the bin thereby creating a plenum between the base and the supported floor. The supported floor has perforations through it so that air which may be heated or ambient can be passed from outside the bin into the plenum and up through the perforations in the floor for passage through overlying grain. The air may be used to dry, cool or otherwise condition overlying grain in the bin, e.g. to prevent subsequent spoilage of the grain. Such bins may serve as drying bins for continuous or batch drying and/or for longer term storage.

Supported bin floors generally include a plurality of longitudinal panels cut to appropriate lengths and arranged side-by-side to substantially cover the entire floor area of the bin.

Grain bin floor supports are known in the art. One such example is a Z-Post support manufactured by Sukup Manufacturing Company which has a Z-shape, a diagonal portion that provides additional support across the center of the floor plank, and sides that provide a self-tightening spring action lock. These supports require the use of specially designed bin floors.

Another floor support, also manufactured by Sukup Manufacturing Company is the Sukup Super Supports'. This design has a welded rod frame that allows air to flow freely throughout the bin plenum area. This open design provides less restriction for better air flow and heat distribution. The angle of the iron base provides stability. Also, the support is fast and easy to install and may be used with many bin floors. However, this design is more costly and difficult to manufacture. Therefore, there exists a need in the art for a floor support that addresses these problems.

An objective of the invention is to provide a floor support that is easy to manufacture without wire welding.

Another objective of the present invention is to provide a floor support that is more economical to manufacture.

These and other objectives will be apparent to those skilled in the art from the following description, drawing and claims.

BRIEF SUMMARY OF THE INVENTION

A floor support for a grain bin floor made from a sheet of galvanized steel. A top surface, a flat bottom surface and flat ends. The floor support has a plurality of flanges and notches disposed within the top surface and a plurality of openings disposed through the sheet of galvanized steel. Positioned between each opening is a first bend. Positioned on either side of every other first bend is a second bend thereby forming a z-shaped floor support.

DETAILED DESCRIPTION OF THE PREFERRED EMBODIMENT

Figure 1:
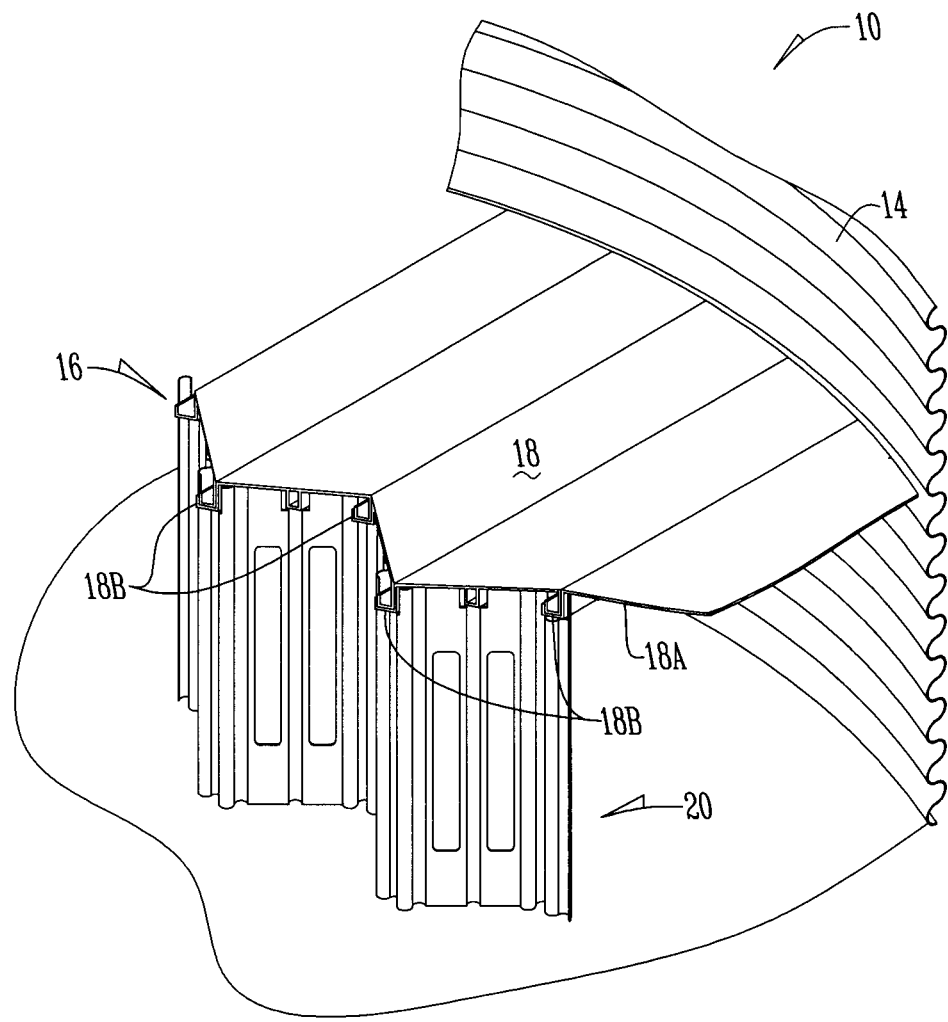
FIG. 1 is a partial perspective view of a grain bin.
Figure 2:
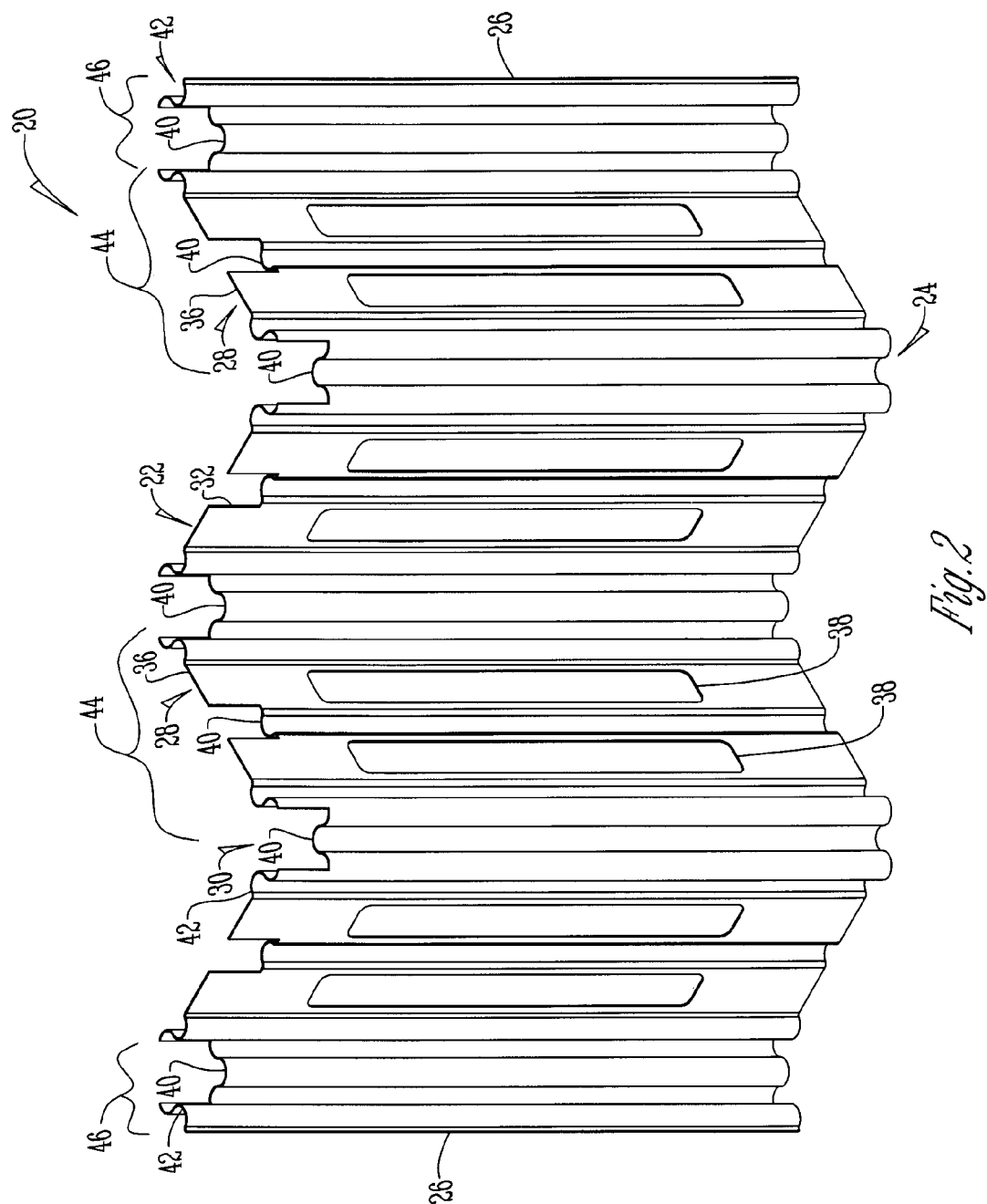
FIG. 2 is a perspective view of a floor support for a grain bin.

FIG. 1 illustrates a partial perspective view of a prior art grain bin 10 having a concrete pad or foundation 12 and a circular wall 14, typically formed of corrugated sheet metal, with the supported grain bin floor system 16. The supported floor system 16 has floor panels 18 which have a perforated upper surface 18A to provide for the passage of conditioning air, e.g., drying and/or cooling air. This air is conveyed into the bin by a fan (not shown), which may include a heater (not shown) located outside the bin 10, and enters the bin 10 through an opening. The air passes into the plenum below the floor panels 18 and up through the perforations into and through the grain (not shown) stored in the bin on the supported floor system 16. For additional structural support floor planks/panels 18 have a foot 18B extending below the upper surface 18A on either side of the perforated upper surface 18A. The feet 18B of adjacently aligned floor panels 18 are placed in interlocking engagement with one another so as to create a solid and continuous floor from a plurality of floor panels 18. The floor panels 18 are supported by a plurality of floor supports 20.

The floor support 20 is made from a single sheet of galvanized steel that is cut and bent to create a stable support for the floor panels 18. The floor support 20 has a top surface 22, a bottom surface 24 and ends 26 which have generally straight outward most edges. The bottom surface 24 of floor support 20 is flat and straight so as to fully engage the typically flat pad or foundation 12. Positioned in the top surface 22 is a plurality of flanges 28 and a plurality of notches 30. Each flange 28 is bounded on either side by a single notch 30; each notch 30 bounded on either side by a single flange 28. Notches 30 are formed by way of cutting or removing material from the top surface 22 of the sheet of galvanized steel. Alternatively, material is cut and bent to form notch 30. Preferably each notch 30 has straight and square sides 32 and/or a straight and square bottom 34. Similarly, flanges 28 preferably have straight and square sides 32 with a straight and square top surface 36.

Positioned within floor support 20 is a plurality of openings 38. Openings 38 are formed by way of cutting, bending, or removing material from the sheet of galvanized steel so as to allow air in the plenum to pass therethrough. The openings 38 facilitate better air flow and heat distribution. Positioned between each opening 38 is a first bend 40. Preferably, first bend 40 is centrally located within each notch 30 and extends between the bottom 34 of notch 30 to the bottom surface 24 of floor support 20. Preferably first bend 40 is a half-circular bend, or takes on the shape of a portion of a pipe or circle when viewed from above. Bend 40 creates more surface area on the bottom 34 of notch 30 as well as provides structural support to the sheet of galvanized steel.

The floor support 20 is bent in opposite directions at a second bend 42 to form a generally zigzag or serpentine pattern. The second bends 42 are positioned adjacent the selected first bends 40 on each side and a plurality of panels 44 are formed that extend from a first second bend 42 to the next or second bend 42. Each panel includes a pair of openings 38, a pair of flanges 28, and a notch 30 formed at a centrally located first bend 40. The notches 30 formed at first bends 40 receive feet 18B of the floor planks 18 to support the floor planks. The second bends 42 and flanges 28 support the crown of the plank 18. Similar to first bends 40, second bends 42 are half-circular in shape, or take on the shape of a portion of a pipe or circle when viewed from above. However, instead of being centrally located and positioned completely within notch 30, as are first bends 40; second bends 42 are partially positioned within notch 30 as well as being partially positioned within flange 28, and extend downward therefrom to bottom surface 24. As such, second bends 42 encompass a portion of notch 30 and flange 28.

Each panel 44 extends in generally straight fashion. However, adjacent panels 44 are positioned at an alternating angle to one another and therefore extend in a Z-shaped fashion in relation to the overall plane of extension of floor support 20. Preferably, adjacent panels 44 are positioned at approximately a 90 degree angle to one other, however any other angle is hereby contemplated. The angle of the second bends 42 smoothly transition adjacent panels 44 into this Z-shaped alignment. Additionally, the angle of the adjacent panels 44, the Z-shaped alignment, creates a stable surface which allows floor support 20 to stand freely without any other additional support, thereby easing the assembly of the grain bin floor.

Floor support 20 is symmetrical about a center vertical axis which extends from top surface 22 to bottom surface 24, and through the center of the centrally located notch 30 and first bend 40. Each end 26 terminates in a first bend 40 having a second bend 42 positioned on either side thereof. That is, the ends 26 have a portion of a flange 28, but only as much as is included in the second bend 42. This arrangement creates an end assembly 46. Preferably, end assemblies 46 of adjacently placed floor supports are positioned in spaced relation to one another. Alternatively, the end assemblies 56 are placed in overlapping condition, which may connect to one another by any method known in the art such as crimping, bolting, screwing, riveting, welding, gluing or the like, to create an endless or continuous Z-shaped floor support assembly. The design supports planks 18 of different widths such as 3½" or 7".

Figure 3:
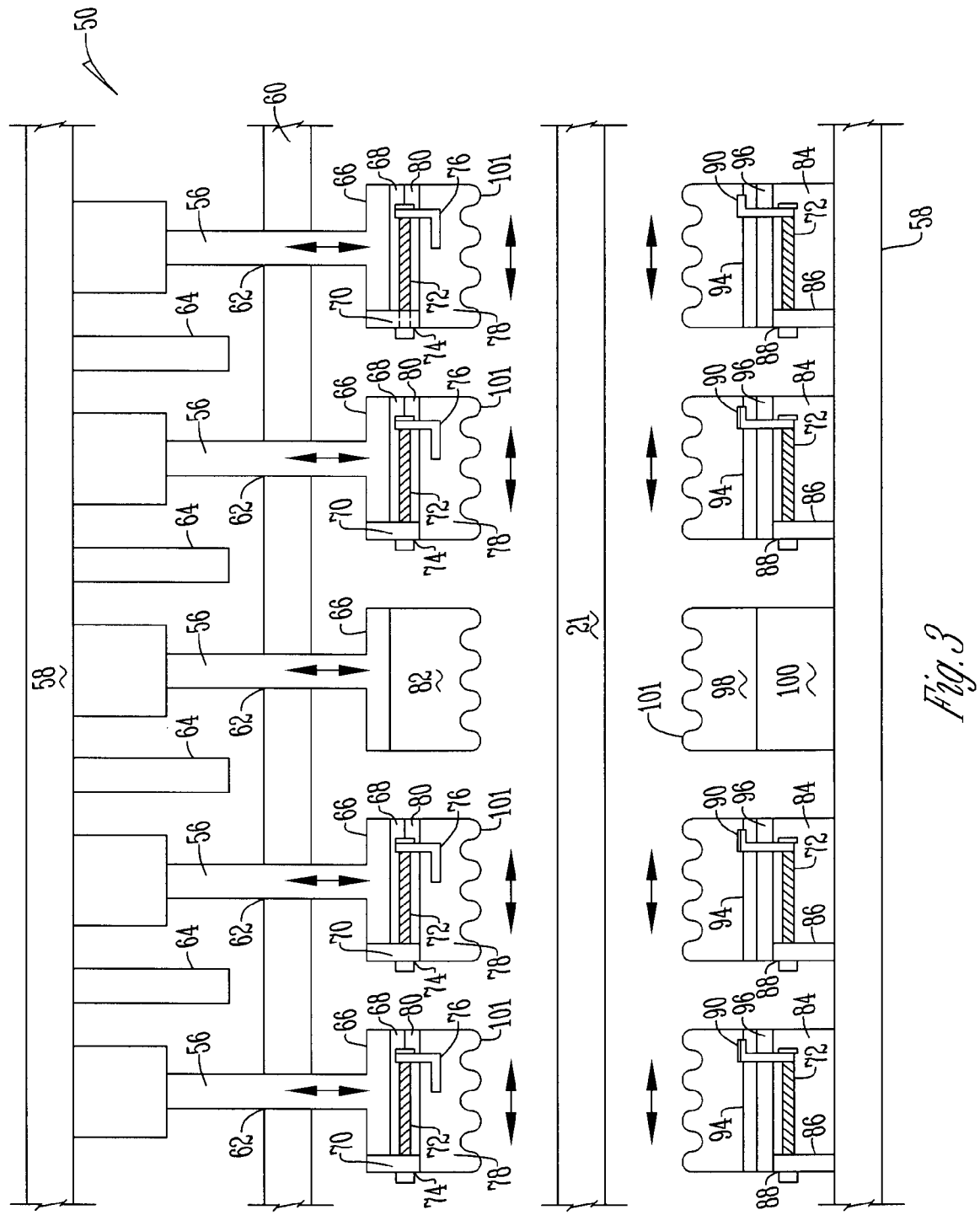
FIG. 3 is a partial side view of a corrugating die.
Figure 4:
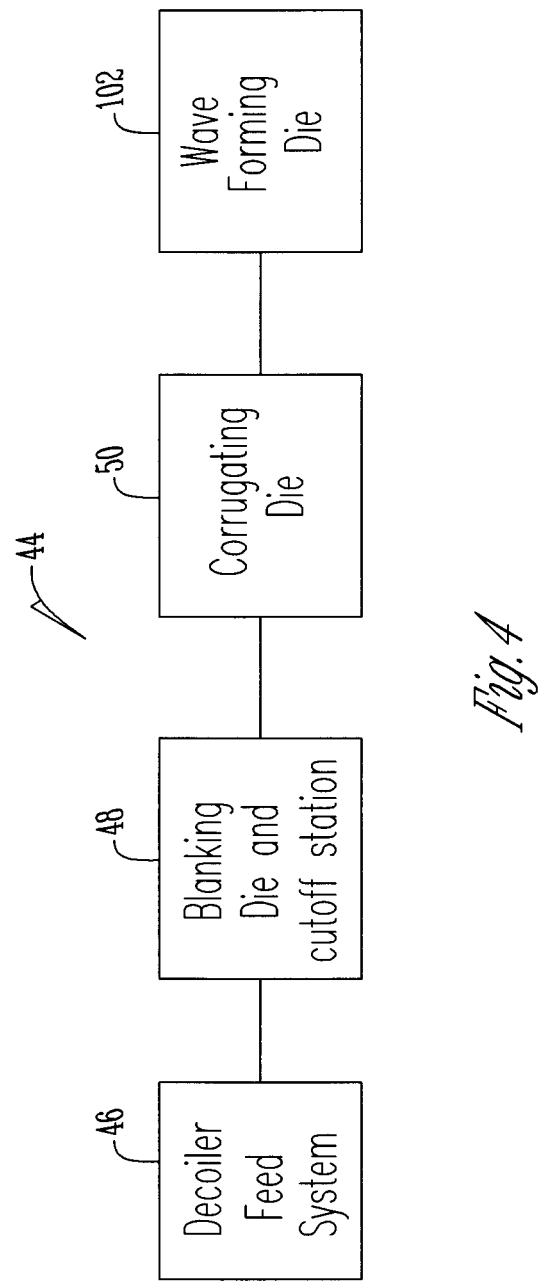
FIG. 4 is a schematic drawing of a die system.

To form a floor support 20, a sheet 21 of galvanized steel having flat and straight ends 26, as well as a flat and straight top and bottom surface 22, 24, is subjected to a progressive die system 44. The sheet is first removed from a decoiler feed system and placed in a blanking die and cutoff station 48. In the blanking die and cutoff station 48 the sheet 21 is punched and cut to remove material from the top surface 22 thereby defining and creating notches 30 and defining flanges 28 and material is cut away from the center of the galvanized sheet to form openings 38. Next, the sheet 21 is moved to a corrugating die 50. The corrugating die 50 as shown in FIG. 3 and comprises a top section 52 and a bottom section 54.

The top section 52 has a plurality of gas spring cylinders 56 that are connected to a frame 58 and extend through openings 60 in a guide member 62. Positioned between each cylinder 56 and connected to the frame are separation walls 64. The end of each cylinder 56 has a support block 66 that has a brass plate 68 connected thereto. The support block has outwardly extending flanges 70 at each end that receive a compression spring 72 through an opening 74 in the flange 70. Connected to the end of the spring 72 is a bracket 76 that is also connected to a moveable die block 78. Connected to each die block 78 is a brass plate 80 positioned to slidably engage brass plate 68 and permit movement of die block 78 in relation to support block 66. Between moveable die blocks 78 is a central stationary block 82 that is connected to cylinder 56.

The bottom section 54 has a plurality of support members 84 that are connected to frame 58. The support members 84 have an outwardly extending flange 86 at both ends that receives a compression spring 72 through an opening 88 in the flange 86. An end of the spring 72 is connected to a bracket 90 that is also connected to a moveable die block 92. Die blocks 78 and 92 are aligned to achieve a desired corrugated pattern. Connected to die block 92 is brass plate 94 that is positioned to slidably engage brass plate 96 that is connected to support member 86 such that die block 92 moves in relation to support member 86. Positioned at the center of the moveable die blocks 92 is a stationary die block 98 connected to a central support block 100.

When activated, cylinders 56 press the die blocks 78 and 82 toward the bottom section 54 such that the metal sheet is pressed between grooves 101 in the die blocks 78, 82, 92 and 98. The pressing force on the metal sheet pulls the moveable die blocks 78 and 92 toward the stationary blocks 82 and 98 such that blocks 78 and 92 slide in relation to support block 66 and member 86 to compress spring 72. The sliding of die blocks 78 and 92 during pressing prevents the sheet from being stretched too thin. At the corrugating die 50 a first bend 40 is made between each opening 38 which is centrally located in each notch 30 and second bends 42 are made on each side of the first bend 40 beginning with the first bend 40 at end 26 and continuing with each alternating first bend 40. Next, the corrugated metal sheet 21 is moved to a wave forming die 102 where the corrugated metal sheet is bent in opposite directions at each first bend 40 to form a Z-shaped floor panel 20 from a single sheet of galvanized steel.

In operation, a plurality of floor panels 20 are positioned in end to end alignment. In this arrangement end assembly 46 of adjacent floor supports 20 are placed in spaced relation to one another thereby creating an extended Z-shaped floor support 20. This process is repeated with a plurality floor supports 20 in parallel spaced alignment until the entire floor or foundation 12 of grain bin 10 is filled with an adequate amount of floor supports 20. The supports are placed closer together depending upon grain depth. In this arrangement notches 30 and flanges 28 of adjacent parallel spaced rows of floor supports 20 are aligned. Once in alignment, floor panels 18 are laid across the parallel rows of floor supports 20 at generally right angles to the floor supports 20. In this arrangement, the crown of the floor panel engages and is supported by the top surface 36 of flange 28. Simultaneously, in this position, the bottom 34 of notch 30 engages and supports the bottom of foot 18B of floor panel 18.

The first bend 40 and second bend 42 provide rigidity and additional surface area for engagement between the floor panel 18 and the floor support 20 thereby providing additional support. In addition, because of the Z-shape of the floor support 20, when floor panels 18 are laid across the floor supports 20 in perpendicular spaced alignment to the overall plane of extension of floor support 20, the panel 44 of floor support 20 extends across the bottom of floor panel 18 at an angle, and preferably a 45 degree angle. This angular arrangement further increases the surface area of engagement between floor support 20 and floor panel 18, as opposed to simply extending straight across, thereby providing additional support to maintain and support the crown of the floor panel 18. In this way a solid, rigid and strong floor support is provided for supporting floor panels 18. The floor support 20 is also economical in that it takes less time to make and requires less material.

The manner in which the floor supports 20 are bent provide for nesting and stacking which allows for compact shipping.

Also, no additional forming or adjustments need to be made to the floor supports after shipping and before assembly.

It will be appreciated by those skilled in the art that other various modifications could be made to the device without departing from the spirit and scope of this invention. All such modifications and changes fall within the scope of the claims and are intended to be covered thereby.

What is claimed is:

1. A method of manufacturing a floor support for a grain bin, steps compromising:
   providing a sheet of metal;
   removing material from a top surface to define alternating notches and flanges;
   bending the sheet at locations centrally located in each notch to create a plurality of first bends; and
   bending the sheet on each side of alternating first bends to form a Z-shape.

2. The method of claim 1 further comprising the stop of removing material from the floor support to form an opening.

3. The method of claim 1 further comprising the step of bending the sheet on each side of the first bend to form a plurality of second bends.

4. The method of claim 1 wherein the stop of bending the sheet at locations centrally located in each notch further comprises sliding the sheet horizontally in a die while the sheet is bent vertically.

5. The method of claim 3 wherein the stop of bending the sheet on each side of the first bend further comprises sliding the sheet horizontally in a die while the sheet is bent vertically.

6. A method of forming a floor support for a grain bin, compromising the steps of:
   removing a sheet of galvanized steel from a decoiler feed system;
   placing the sheet in a blanking die and cutoff station where the sheet is punched and cut to form notches, flanges, and openings;
   moving the sheet to a corrugating die where first and second bends are formed; and
   moving the corrugated sheet to a waive forming die where the corrugated sheet is bent in opposite directions at each first bend to form a Z-shape.

* * * * *

UNITED STATES PATENT AND TRADEMARK OFFICE
CERTIFICATE OF CORRECTION

| | | |
|---|---|---|
| PATENT NO. | : 8,950,231 B2 | Page 1 of 1 |
| APPLICATION NO. | : 13/656935 | |
| DATED | : February 10, 2015 | |
| INVENTOR(S) | : Sukup et al. | |

It is certified that error appears in the above-identified patent and that said Letters Patent is hereby corrected as shown below:

In the Claims

Column 5, Claim 2, Line 18
DELETE after the "stop"
ADD after the -- step --

Column 6, Claim 4, Line 1
DELETE after the "stop"
ADD after the -- step --

Column 6, Claim 5, Line 5
DELETE after the "stop"
ADD after the -- step --

Signed and Sealed this
First Day of March, 2016

Michelle K. Lee
*Director of the United States Patent and Trademark Office*